United States Patent

[11] 3,555,357

[72] Inventors Robert Ernest Gregson;
 Edward Nicholas Freyling, Jr., Scottsdale, Ariz.
[21] Appl. No. 839,028
[22] Filed July 3, 1969
[45] Patented Jan. 12, 1971
[73] Assignee Motorola, Inc.
 Franklin Park, Ill.
 a corporation of Illinois

[54] OVER-CURRENT PROTECTION FOR AN ALTERNATING CURRENT CIRCUIT INCLUDING AUTOMATIC RESET
 10 Claims, 1 Drawing Fig.
[52] U.S. Cl. .................................................. 317/16,
 317/22, 317/36, 317/31
[51] Int. Cl. .................................................. H02h 3/00

[50] Field of Search ........................................... 317/16, 22,
 31, 33, 36; 321/(Inquired), Shoop; 307/100

[56] References Cited
 UNITED STATES PATENTS
 3,132,287 5/1964 Yarbrough .................. 317/33
 3,295,020 12/1966 Borovitz ...................... 317/16X Primary Examiner—J. D. Miller
Assistant Examiner—Harvey Fendelman
Attorney—Mueller, Aichele & Rauner

ABSTRACT: An overcurrent protective apparatus is disclosed for an alternating current circuit in which the circuit is broken when overcurrent exists and the circuit is remade when the fault in the line causing overcurrent is corrected and in which a series current sensing element carries load current for only a short portion of each cycle of the supply voltage.

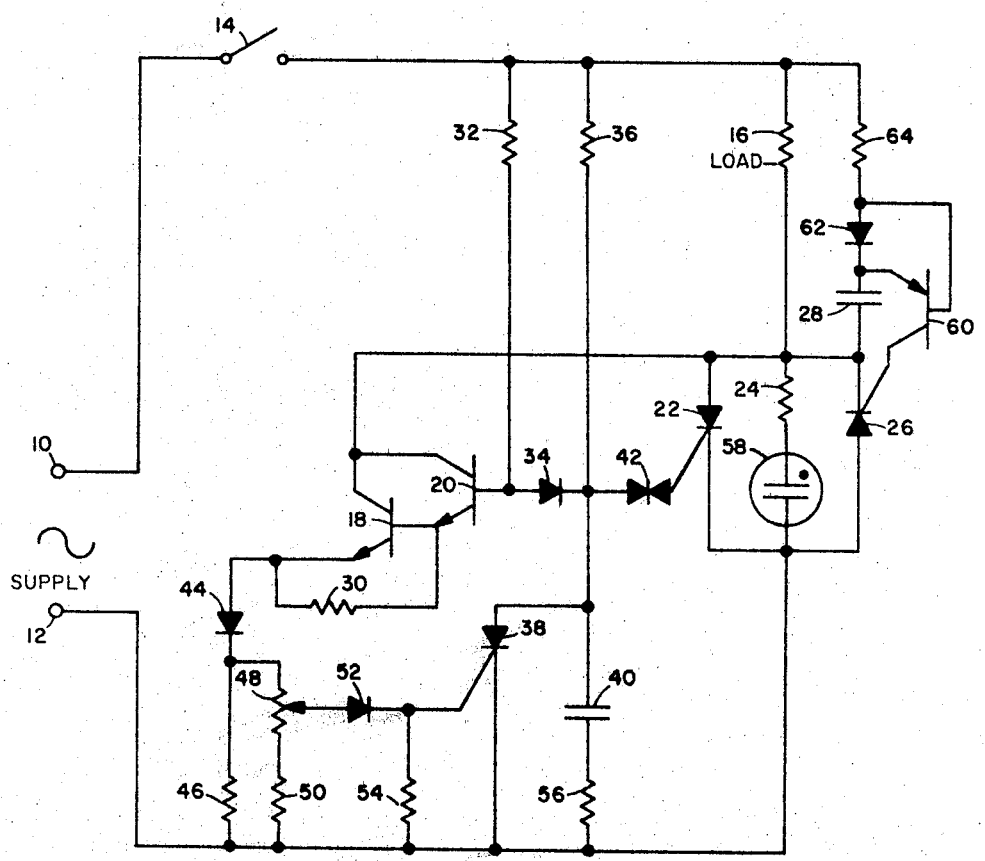

OVER-CURRENT PROTECTION FOR AN ALTERNATING CURRENT CIRCUIT INCLUDING AUTOMATIC RESET

BACKGROUND

This invention relates to overcurrent protective devices.

Many known overcurrent protective devices open a protected direct current circuit when the circuit draws excessive current. The operator then clears up the short circuit and manually closes the circuit. Overcurrent protective devices require a series connected current sensing element through which the load current or current which is proportional to the load current flows at all times. Such a series connected current sensing device, which is usually a resistor, dissipates a substantial amount of energy.

It is an object of this invention to provide an improved overcurrent protective circuit suitable for protecting an alternating current circuit.

SUMMARY

In accordance with this invention, a current sensing element is connected in series with an alternating current supply circuit for a load. During a small portion of a half cycle of the flow of the alternating current through the load, current flows through the current sensing element. For the remainder of the said half cycle, current flowing through the load is shunted away from the current sensing element. If the current flow through the current sensing element in a portion of a half cycle is above a predetermined amount, the load is disconnected from the supply for the remainder of the cycle. Since the current through the load is sensed once each alternate half cycle (the load being disconnected from the load sensing element for the other half of each cycle), the protective device resets itself during any cycle that the current demanded by the load is not excessive. Since the load current flows through the current sensing element only during a portion of alternate half cycles of the supply current, the current sensing element dissipates very little energy during the operation of the protective circuit to be described.

DESCRIPTION

The invention will be better understood upon reading the following description in connection with the accompanying drawing in which the sole FIG. is a circuit diagram of a circuit supplied by alternating current and including the invention.

An alternating current supply (not shown) is connected between the terminals 10 and 12. An on-off switch 14 is connected between the terminal 10 and one terminal of the load which is shown as a resistor 16. The other terminal of the load 16 is connected to the collectors of two NPN transistors 18 and 20, to the anode of a first silicon controlled rectifier (hereinafter SCR) 22, to one terminal of a resistor 24, to the cathode of a second SCR 26 and to one terminal of a storage capacitor 28. The emitter of the transistor 20 is connected to the base of the transistor 18 and the emitters of the transistors 18 and 20 are connected together through a resistor 30. The switch 14 is connected through a bias resistor 32 both to the base of the transistor 20 and to the anode of the diode 34. The cathode of the diode 34 is connected to the switch 14 by way of a resistor 36. The cathode of the diode 34 is also connected to the anode of an SCR 38, to one terminal of a capacitor 40 and to one terminal of a threshold device 42 whose other terminal is connected to the control electrode of the SCR 22. The threshold device 42 may be a three-layer or a four-layer semiconductive diode or any other threshold device that exhibits negative resistance after the threshold is exceeded. The cathode of the SCR 22 is connected to the terminal 12.

The emitter of the transistor 18 is also connected to the anode of a diode 44 whose cathode is connected to the terminal 12 through a resistor 46 and also through a potentiometer resistor 48 and a resistor 50 in series. The tap on the potentiometer 48 is connected to the anode of a diode 52 whose cathode is connected to the termal 12 through a resistor 54.

The cathode of the diode 52 is connected directly to the control electrode of the SCR 38. The cathode of the SCR 38 is connected to the terminal 12. The other terminal of the capacitor 40 is connected to the terminal 12 by way of a resistor 56.

The other terminal of the resistor 24 is connected through an indicating gas-filled tube 58 to the terminal 12. The other terminal of the capacitor 28 is connected to the emitter of a PNP transistor 60 and to the cathode of the diode 62. The anode of the diode 62 is connected to the switch 14 by way of a resistor 64 and to the base of the transistor 60, whose collector is connected to the control electrode of the SCR 26.

Let it be assumed that switch 14 is closed and that the described circuit is operating normally when no overcurrent protection is necessary. Let the terminal 10 be positive with respect to the terminal 12. Then bias current flows through the resistor 32, the base to emitter path of the transistor 20, the base to emitter path of the transistor 18 and the resistor 30 in parallel, the diode 44, the current sensing resistor 46 and through the resistors 48 and 50 in parallel with the resistor 46, biasing the transistors 18 and 20 into conduction. Load current will flow through the load 16, the transistors 18 and 20 and the resistor 30, the diode 44 and the parallel circuit comprising the resistors 46, 48 and 50. The voltage applied to the anode of the diode 52 is a measure of the current flowing through the load 16. Since the current taken by the load 16 is normal, this voltage is too low to overcome the forward threshold of the diode 52 whereby the SCR 38 has insufficient voltage applied to its control electrode and the SCR 38 remains nonconductive. In the meantime, the capacitor 40 is charged by way of the resistors 32 and 36 and the diode 34 and the resistor 56 to a voltage whereby the threshold device 42 is broken down, turning the SCR 22 on. This happens very soon after the line 10 becomes positive, whereby the current for the load now flows through the SCR 22 and is shunted away from the current sensing resistor 46. The breakover voltage of the threshold device 42 and the time constant of the resistor 36 and the capacitor 40 are such that current flows through the resistor 46 for a small fraction of the half cycle when line 10 is positive, typically 40° or less. As soon as the SCR 22 becomes conductive, the voltage across the resistor 24 and gas-filled tube 58 becomes very low. The breakdown voltage of the gas-filled tube 58 is much larger than the breakdown voltage of the threshold device 42 whereby the gas-filled tube 58 does not light up during the short time that the SCR 22 is nonconductive, that is, while the capacitor 40 is charging to the potential at which the threshold device 42 will break down.

When current is flowing through the load 16, a voltage drop is developed thereacross and the capacitor 28 charges through the resistor 64 and the diode 62 until the line voltage falls below the voltage on the capacitor 28. The diode 62 then becomes reverse biased, the transistor 60 becomes conductive, and the capacitor 28 begins to discharge into the control electrode of the SCR 26. As soon as the terminal 12 becomes positive with respect to the terminal 10, the SCR 26 is rendered conductive whereby current can flow from the now positive terminal 12 through the conductive SCR 26 and the load 16 to the terminal 10.

Now let it be assumed that the load 16 takes more than its rated current. In the first short portion of the half cycle when the terminal 10 is positive, the current is through the load also flows through the resistor 46 as noted above. Since this current is excessive, the voltage applied to the diode 52 will exceed its forward bias, causing the SCR 38 to become conductive, preventing the charging of the capacitor 40 and preventing the SCR 22 from becoming conductive. Also, substantially all bias current will be shunted away from the transistors 20 and 18 by way of the diode 34 and the SCR 38 causing them to become nonconductive. The load current for the load 16 is cut off. It is noted that the resistance of the load 16 will always be much higher than the resistance of the current sensing resistor 46, whereby the current flowing in the resistor 46 will depend primarily on the resistance of the load 16. When the SCR 22 and the transistors 18 and 20 are not conductive, the drop across the load 16 is zero whereby the capacitor 28 cannot charge. Therefore the circuit for the load 16 is broken for a full cycle of the alternating current supply as long as in the early part of a half cycle when the terminal 10 is positive, the current through the load 16 reaches a value such that the SCR 38 is made conductive.

When the SCRs 22 and 26 are nonconductive, the gas-filled tube 58 lights up indicating that the protective circuit is operating and that not current is flowing through the load 16.

During each cycle when the terminal 10 is positive, excessive current flow for a short period through the load 16 prevents turning on of both SCRs 22 and 26. However, if during the next period when the terminal 10 is positive the current through the load is not excessive, the SCR 22 is turned on which causes current flow through the load 16 and consequent turning on of the SCR 26 during the immediately following half cycle. That is, the described overcurrent device turns off the supply of current for the load throughout each cycle during a portion of a first half cycle of which the current drawn by the load is excessive and does not turn the current supply off during a cycle in which the current drawn in a first half cycle is not excessive, whereby the described overcurrent circuit need not be reset after it has turned itself off.

If the load current is small, the transistor 18 may be omitted, in which case the resistor 30 may also be omitted and the emitter of the transistor 20 may be connected directly to the anode of the diode 44.

We claim:

1. An overcurrent protective circuit comprising, a first and a second terminal to be connected to a source of electrical supply:
    a load;
    a normally open switching element;
    a current sensing element;
    a connection from said first terminal through said load and through said current sensing element to said other terminal;
    said switching element being connected in shunt with said current sensing element;
    delay means for closing said switching element to bypass said current around sensing element after a short delay; and
    means responsive to a predetermined voltage appearing across said current sensing element to inhibit closing of said switching element by said delay means whereby the current flowing through said load is reduced when the voltage across a said current sensing element due to the current flow therethrough reaches said predetermined value.

2. The invention as expressed in claim 1 in which alternating current is applied to said terminals.

3. The invention as expressed in claim 1 in which alternating current is applied to said terminals and in which a second switching means is connected across said first switching means, said two switching means being unidirectionally conductive and being oppositely poled and in which means are provided to render the two switching means conductive during alternate half cycles of said alternating current supply source.

4. The invention as expressed in claim 1 in which a third switching means is connected between said load and said current sensing means and in which means are provided to open said third switching means in response to said predetermined voltage appearing across said current sensing means.

5. An overcurrent protective circuit comprising:
    a pair of terminals to which an alternating current supply may be connected;
    a load;
    a first and a second switching means;
    a current sensing means;
    means for connecting a first one of said terminals through said load, said first switching means and said current sensing means in series to the other of said pair of terminals;
    means to connect said second switching means across said first switching means and said current sensing means in series;
    means for causing conduction of said second switching means after a period of delay after a beginning of a first half of a cycle of the alternating current applied to said terminals, whereby the current flowing through said current sensing means in a measure of the current flowing in said load during the period of said delay; and
    means to inhibit the conduction of said first and second switching means responsive to the voltage across said current sensing means arriving at a predetermined voltage during said delay period, whereby the supply circuit for said load is broken if the current flow therethrough is above a predetermined amount during said delay period.

6. The invention as expressed in claim 5 in which said second switching means is a silicon controlled rectifier.

7. The invention as expressed in claim 5 in which said first switching means comprises at least one transistor and means are provided to bring the base of said transistor substantially to zero potential upon said predetermined voltage appearing across said current sensing means.

8. The invention as expressed in claim 7 in which said last mentioned means comprises a third switching means.

9. The invention as expressed in claim 5 in which a fourth switching means is provided, said second and fourth switching means having rectifying properties and in which means are provided responsive to current flow in said load during a first half of a cycle to cause conduction of said fourth switching means during the second half of said cycle.

10. An overcurrent protective means comprising:
    a load;
    a current sensing means;
    a pair of terminals to be connected to a source of alternating current;
    means for passing at least a portion of the current flowing from one of said terminals to the other of said terminals through said load and also through said current sensing means for a small portion of an alternating current cycle;
    means for shunting the current passing through said load around said current sensing means for the remainder of said cycle; and
    means responsive to the current flowing through said current sensing means arriving at a predetermined level to break the circuit for the load whereby the flow of current through said load is prevented.